(12) United States Patent
Lelic et al.

(10) Patent No.: US 6,519,081 B2
(45) Date of Patent: Feb. 11, 2003

(54) METHOD OF OPERATING A NOISE-COMPENSATING GAIN CONTROLLER FOR AN OPTICAL AMPLIFIER

(75) Inventors: Muhidin Lelic, Horseheads, NY (US); Ray L. Ju, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 31 days.

(21) Appl. No.: 09/845,402

(22) Filed: Apr. 30, 2001

(65) Prior Publication Data

US 2001/0033413 A1 Oct. 25, 2001

Related U.S. Application Data

(63) Continuation-in-part of application No. 09/821,926, filed on Mar. 30, 2001, now abandoned.
(60) Provisional application No. 60/196,596, filed on Apr. 13, 2000.

(51) Int. Cl.$^7$ .................................................. H01S 3/00
(52) U.S. Cl. .............................. 359/341.4; 359/341.43
(58) Field of Search ......................... 359/341.4, 341.41, 359/341.43

(56) References Cited

U.S. PATENT DOCUMENTS

| | | | |
|---|---|---|---|
| 5,822,112 A | * 10/1998 | Itou et al. | ..................... 359/341 |
| 6,108,123 A | 8/2000 | Kinoshita | |
| 6,111,686 A | 8/2000 | Toyohara | |
| 6,111,688 A | 8/2000 | Kobayashi et al. | |
| 6,115,173 A | 9/2000 | Tanaka et al. | |
| 6,118,576 A | 9/2000 | Sugiya et al. | |
| 6,125,583 A | 10/2000 | Murray et al. | |
| 6,172,534 B1 | 1/2001 | Brierley | |
| 6,198,571 B1 | 3/2001 | Yang | |
| 6,201,636 B1 | 3/2001 | Noda | |
| 6,229,643 B1 | 5/2001 | Nakamura | |
| 6,233,091 B1 | 5/2001 | Kosaka et al. | |
| 6,246,514 B1 | 6/2001 | Bonnedal et al. | |
| 6,256,141 B1 | 7/2001 | Kosaka | |
| 6,259,553 B1 | 7/2001 | Kinoshita | |
| 6,266,466 B1 | 7/2001 | Nabeyama et al. | |
| 6,271,962 B1 | 8/2001 | Choi | |
| 6,275,330 B1 | 8/2001 | Izumi | |
| 6,275,331 B1 | 8/2001 | Jones et al. | |
| 6,282,017 B1 | 8/2001 | Kinoshita | |
| 6,288,836 B1 | 9/2001 | Kawasaki et al. | |
| 2001/0033413 A1 | * 10/2001 | Lelic et al. | ............... 359/341.4 |

FOREIGN PATENT DOCUMENTS

JP             408116117 A    *    5/1996

OTHER PUBLICATIONS

Konishi et al, "Dynamic Gain–Controlled Erbium–Doped Amplifier Repeater for WDM Network" (1997), Technical Digest, pp 18 and 19.*

(List continued on next page.)

*Primary Examiner*—Mark Hellner
(74) *Attorney, Agent, or Firm*—Svetlana Z. Short; Thomas W. Cole

(57) ABSTRACT

A method of operating a noise compensating gain controller in an optical amplifier to avoid overshoot of a selected gain level during amplification transients is provided. The first step of the method includes the computation of a difference in the amount of amplification necessary to bring the combination of the signal and noise component forming the optical output to the selected gain level. Next, a computation is made of an adjustment of the amplification difference that is necessary to bring the signal component of the output to the selected gain level at a post-transient, steady-state condition of the optical input. In the final step, the amplification is changed in accordance with the computed difference in the amount of amplification either prior to or simultaneously with the adjustment to this difference.

21 Claims, 7 Drawing Sheets

OTHER PUBLICATIONS

A. Yu, et al., "Design and Modeling of Laser–Controlled Erbium–Doped Fiber Amplifiers," pp. 1013–1018, IEEE Journal of Selected Topics in Quantum ElectronicEs, vol. 3, No. 4, Aug., 1997.

L. Tancevski, et al., "Gain Control in EDFA's by Pump Compensation," IEEE Photonics Technology Letters, pp. 1313–1315, vol. 10, No. 9, Sep. 1998.

H. Suzuki, et al., "Dynamic Gain Control by Maximum Signal Power Channel in Optical Linear Repeaters for WDM Photonic Transport Networks," IEEE Photonics Technology Letters, pp. 734–736, vol. 10, No. 5, May, 1998.

Seo Yeon, et al., "Dynamic Gain and Output Power Control in a Gain–Flattened Erbium–Doped Fiber Amplifier," IEEE Photonics Technology Letters, pp. 787–789, vol. 10, No. 6, Jun. 1998.

A. K. Srivastava, et al., "Fast–Link Control Protection of Surviving Channels in Multiwavelength Optical Networks," IEEE Photonics Technology Letters, pp. 1667–1669, vol. 9, No. 12, Dec., 1997.

Yan Sun, et al., "Optical Fiber Amplifiers for WDM Optical," Bell Labs Technical Journal, pp. 187–206, Jan.–Mar., 1999.

Stephen R. Chinn, "Simplified Modeling of Transients in Gain–Clamped Erbium–Doped Fiber Amplifiers," pp. 1095–1100, Journal of Lightwave Technology, vol. 16, No. 6, Jun., 1998.

Haruo Okamura, "Automatic Optical Loss Compensation with Erbium–Doped Fiber Amplifier," pp. 1110–1116, Journal of Lightwave Technology, vol. 10, No. 8, Aug., 1992.

A. A. M. Saleh et al., "Modeling of Gain in Erbium–Doped Fiber Amplifiers," pp. 714–717, IEEE Photonics Techology Letters, vol. 2, No. 10, Oct. 1990.

E. Desurvire, "Analysis of Transient Gain Saturation and Recovery in Erbium–Doped Fiber Amplifiers," pp. 196–199, IEEE Photonics Technology Letters, vol. 1, NO. 8, Aug. 1989.

H. Suzuki et al., "Power Excursion Suppression in Cascades of Optical Amplifiers with Automatic Maximum Level Control," pp. 1051–1053, IEEE Photonics Technology Letters, vol. 11, No. 8, Aug., 1999.

Naoki Suzuki, et al., "Optical Fiber Amplifiers Employing Novel High–Speed AGC and Tone–Signal ALC Functions for WDM Transmission Systems," Information Technology R & D Center, Mitsubishi Electric Corporation.

Yuxing Zhao, et al., "Gain Clamped Erbium–Doped Fiber Amplifiers—Modeling and Experiment," pp. 1008–1012, IEEE Journal of Selelcted Topics in Quantum Electronics, vol. 3, No. 4, Aug. 1997.

Y. Sun, et al., "Average Inversion Level, Modeling, and Physics of Erbium–Doped Fiber Amplifiers," pp. 991–1007, IEEE Journal of Selected Topics in Quantum Electronics, vol. 3, No. 4, Aug., 1997.

Motoshima et al., "Dynamic compensation of transient gain saturation in erbium–doped fiber amplifiers by pump feedback control," Technical Digest OFC'93, 40–42 (1993).

Srivastava et al., "Fast control in erbium–doped fiber amplifier, " Technical Digest OAA '96, 24–27 (1996).

Karasek et al., "Analysis of Dynamic Pump–Loss Controlled Gain–Locking System for Erbium–Doped fiber amplifiers," IEEE Photonics Technical Letters, 10, 1171–1173 (1998).

Yoon et al., "Reference level free multichannel gain equalization and transient gain suppression of EDFA with differential ASE power monitoring," IEEE Photonics Technology Letter, vol. 11, No. 3, Mar. 1999, pp. 316–318.

Okamura, "Automatic optical loss compensation with erbium–doped fiber amplifier," Journal Of Lightwave Technology, 16 (5), (1995).

Richards et al., "A theoretical investigation of dynamic all–optical automatic gain control in multichannel EDFAs and EDFA cascades," IEEE J. Topics in Quantum in Quantum Electronics, 3 (4) (1997).

Park et al., "Dynamic gain and output control in gain–flattened EDFA," IEEE Prot. Tech. Letters, 10(6), 1998, pp. 787–789.

Takahashi et al., "An output power stabilized erbium doped fiber amplifier with automatic gain control," IEEE J. Selected Topics in Quantum Electronics, 3 (4) (1997).

Landousies et al., "Low–power transient in multichannel equalised and stabilised gain amplifier using passive gain control," Electronics Letters, Sep. 26, 1996, vol. 32, No. 20.

Yadlowsky, "Independent Control of EDFA Gain Shape and Magnitude Using Excited–State Trapping", IEEE Photonics Technology Letters, vol. 11, No. 5, May 1999, pp. 539–541.

Desurvive et al., "Dynamic Gain Compensation in Saturated Erbium–Doped Fiber Amplifiers", IEEE Photonics Technology Letters, vol. 3, No. 5, May 1991, pp. 453–455.

Desurvive, "Erbium Doped Fiber Amplifier—Principles and Applications," John Wiley & Sons, Inc. (1994), see Chapter 6, sections 3–4 (pp. 469–487).

Giles et al., "Modeling Erbium–Doped Fiber Amplifiers", Journal of Lightwave Technology, vol. 9, No. 2, Feb. 1991, pp. 271–283.

* cited by examiner

METHOD OF OPERATING A NOISE-COMPENSATING GAIN CONTROLLER FOR AN OPTICAL AMPLIFIER

CROSS REFERENCE TO RELATED APPLICATIONS

This application is a continuation-in-part of an application entitled "Method for Controlling Performance of Optical Amplifiers," filed on Mar. 30, 2001, and based upon U.S. Regular application Ser. No. 09/821,926 filed Mar. 30, 2000, adandoned, which claims the benefit of U.S. Provisional application Serial No. 60/196,596 filed Apr. 13, 2000.

FIELD OF THE INVENTION

This invention generally relates to control systems for optical amplifiers and is specifically concerned with a method of operating a noise-compensating gain controller for an erbium-doped fiber amplifier that avoids overshoot of a selected gain level during amplification transients.

BACKGROUND OF THE INVENTION

Erbium-doped fiber amplifiers (EDFAs) are used in optical transmission networks to extend transmission distances and to compensate for losses from various network elements. Such amplifiers typically comprise a pump laser whose output is optically coupled to the input of two or more, serially connected coils of erbium-doped optical fiber. In operation, the output of the pump laser excites the atoms of erbium dopant within the serially connected coils of doped fibers. These excited atoms release their excess energy in proportion to the strength of the incoming optical signal, which results in an amplified output. When such EDFAs are used simply as amplification relay stations along a single, long-distance optical circuit, there is little need for a device to specifically control the amount of gain that the amplifier imparts on the incoming optical signal. However, as optical systems have become more complex, the need for such gain control systems has increased. Such a need may arise, for example, when an optical network is installed around an urban area. Under such circumstances, the distances between the optical amplifiers may be very different. If the EDFAs in the system all have the same amplification capacity, this capacity must be adjusted by way of a gain control device so that the signal strength remains uniform throughout all branches of the network.

In the past, such gain control has typically been achieved by the combination of a digital signal processor in combination with a power regulation circuit that modulates the amount of electrical power applied to the pump laser. The digital signal processor generates a control signal that instructs the power regulation circuit to deliver electrical power to the pump laser at a level consistent with a selected gain set-point. The specific control signal associated with a particular set-point is determined by an empirically derived control algorithm which is programmed into the memory of the signal processor. Hence, when the set-point of the gain controller is selected to be, for example, at 25 decibels (dB), the digital processor generates a control signal that causes the pump laser to amplify the incoming optical signal until the strength of the output corresponds to the amount selected at set-point, i.e., 25 dB.

While such EDFA gain controllers can work well for their intended purpose, the applicant has observed that a significant problem arises when the incoming optical signal is significantly contaminated with a noise component known as amplified spontaneous emission (ASE) in the art. Because such prior art gain controllers amplify the total output to a desired gain level, and because the optical output is nearly always the combination of an amplified signal plus a variable amount of amplified ASE, such controllers under-amplify the signal in direct proportion to the power of the ASE component mixed therewith. Such under-amplification is much worse for low input signals, when the ASE power content may be larger than the signal power. In all cases, the resulting under-amplification of the optical input signal can lead to undesirable non-uniformities in the strength of the signals transmitted through the optical network.

To solve these problems, the applicant has developed a noise-compensating gain controller capable of amplifying the signal component of the optical output to the desired gain level selected by the operator. This controller is described in detail in U.S. application Ser. No. 09/821,926 filed Mar. 30, 2001, and assigned to Corning Incorporated, and generally comprises a gain detecting circuit, a set-point circuit for providing a signal indicative of a selected gain level of the amplifier, and a digital signal processor for adjusting the gain level so that the gain of the signal component of the output is equal to a select gain level. Upon selection of a specific gain level via the set-point circuit, the digital signal processor compares the selected gain level with the actual gain level indicated by the gain detecting circuit, and computes an amplification difference necessary to equalize the actual gain with the selected gain. The processor also computes the amount that the gain will have to be adjusted to bring the signal component of the amplifier output to the selected gain level. This computation is implemented by means of an empirically derived formula that, for every power level of optical input, assigns an associated ASE power level. The processor than proceeds to change the amplification by the computed difference and to adjust this difference to bring the gain of the signal component of the output to the selected gain level.

While such a noise compensating gain controller represents a substantial advance in the prior art, the applicants have observed that an amplification overshoot problem may occur during amplification transients. Such transients typically happen as a result of rapid fluctuations in the power of the optical input, although they could occur from a rapid change in the gain set-point by the system operator. The applicants have determined that such overshoots occur when the digital signal processor does not complete the computation of the amount of noise-compensating adjustment required in the amplification at the same time it completes the computation of the amount of amplification difference necessary to bring the actual gain to the same level as the selected gain. Such differences in computation time occur as a result of the greater complexity of the amplification compensation calculations, and the operating speed limitations of most commercially available processors. Under such circumstances, the processor completes the computation of the amplification difference necessary to bring the actual gain to the same level as the selected gain prior to completing the computation of the adjustment to the gain necessary to bring the gain of only the signal component to the selected gain at a post-transient, steady-state condition of the optical input. The processor then proceeds to change the amplification level in accordance with the completed first computation in combination with a non-final, transient computation of the gain adjustment. Because the non-final computation of the gain adjustment usually yields a value that is significantly higher than the completed computation of the gain adjustment, the initial change of the amplification level is higher than the proper gain adjustment under steady-state conditions, thus resulting in a localized spike or overshoot of the steady state value of the final amount of amplification, as is indicated in FIG. 3B. In the graph of FIG. 3B, the overshoot is approximately 2 dB, and may occur when the total input power of the optical signal changes between −26 and −11 dB, as illustrated in FIG. 3A. Such change could easily occur under normal operating conditions of the amplifier as the result of the adding of channels, which typically occur in time periods of less than 100 micro seconds. The resulting 2 dB overshoot or spike in amplification is highly undesirable in an optical network of interconnected amplifiers, as each amplifier in the network would amplify the overshoot to an even greater height relative to the signal received. The overall effect would be a deterioration in the bit error rate (BER) in the transfer of data.

Clearly, there is a need for a method of operating in noise-compensating gain controller during amplification transients which avoids such spikes of amplification overshoots. Ideally, such a method would not require the addition of any new components or alteration of the connections of the noise-compensating optical gain controller, and could be easily and simply implemented merely by the programming of a relatively simple control algorithm into the digital signal processor.

SUMMARY OF THE INVENTION

The invention is a method for operating a noise-compensating gain controller that avoids undesirable overshooting of the gain level during amplification transients. The method is particularly adapted for use in a gain controller having a gain detecting circuit that continuously monitors the gain of the optical input, a set point circuit that provides a signal indicative of a selected gain level of the amplifier, and a digital processor circuit that receives signals from the previously mentioned circuit components, and changes the gain level so that the gain of the entire (signal+ noise) output is equal to the selected gain level, and then proceeds to adjust the gain level so that the gain of the signal component only the optical output is equal to the selected gain level.

In the first step of the method, the digital signal processor first determines a difference in the amount of amplification necessary to bring the combination of the signal and noise component forming the optical output to the selected gain level.

In the next step, the digital signal processor determines an adjustment of the difference necessary to bring the signal component of the output to the selected gain level at a post transient, steady-state condition of the optical input.

In the final step of the method, the amplification is changed in accordance with the difference in the amount of amplification determined either prior to or simultaneously with the determined adjustment.

Preferably, the method further includes the step of determining that the power level of the transient is larger than a preselected threshold level prior to implementing the aforementioned steps of determining a difference in the amount of amplification, and determining an adjustment to that difference.

In one embodiment of the method, the computation of the amplification adjustment to compensate for noise is deferred until, amplification is first changed in accordance with the determined difference in the amount of amplification necessary to bring the gain of the total optical output (noise+ signal) equal to the selected gain. Then, the amplification adjustment is computed and then added to the amplification.

In another embodiment of the invention, both the difference determination step and the adjustment determination step are implemented simultaneously such that the amplification difference and a post-transient adjustment are determined at substantially the same time. The amplification is then changed simultaneously in accordance with the simultaneously determined amplification difference and amplification adjustment. In one implementation of this alternate embodiment, the processing time for determining the amplification difference is protracted until it is equal to the processing time required to determine the post-transient amplification adjustment. In another implementation of this embodiment, one or more of the lower level tasks that the digital processor normally performs is disabled in order to free up a sufficient amount of processing capacity to complete the computation of the amplification difference and amplification adjustment at a simultaneous time which is sooner than the implementation requiring the protraction of the processing time for the amplification difference determination.

In all instances, undesirable overshoot of a selected gain level is avoided by refraining from adjusting the gain level on the basis of a non-final computation of the noise-compensating adjustment to the gain difference based upon a transient condition of the optical output.

BRIEF DESCRIPTION OF THE DRAWINGS

FIG. 1 is a schematic diagram of a noise compensating gain controller in an optical amplifier in which the method of the invention is particularly adapted to;

DETAILED DESCRIPTION OF THE INVENTION

Figure 1:
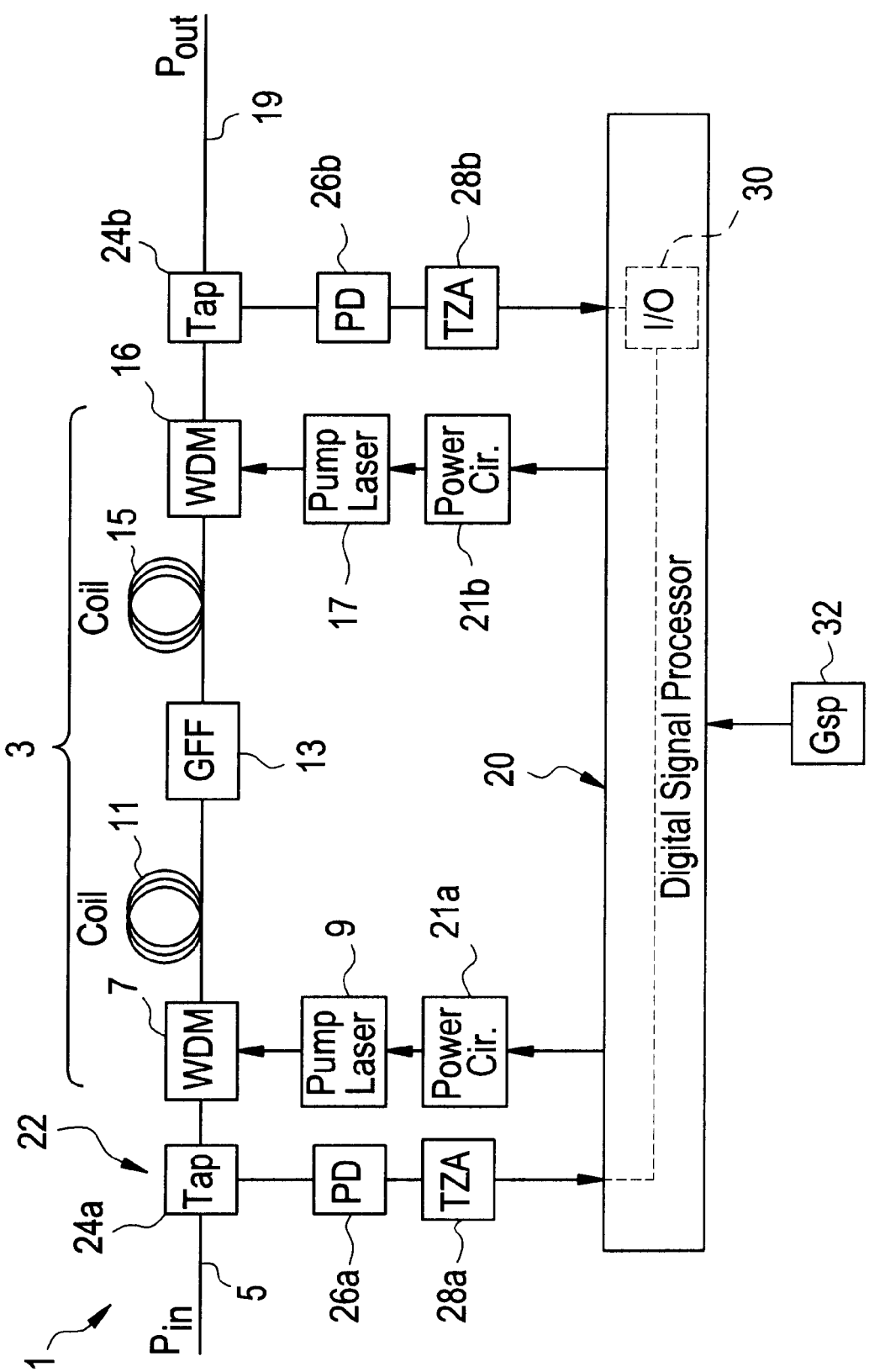

With reference to FIG. 1, the method of the invention is particularly adapted for use with a noise compensating gain controller 1 in an EDFA-type optical amplifier 3. Such an amplifier 3 includes an optical waveguide 5 for receiving an optical input, and a wavelength division multiplexer 7 for coupling the output of a pump laser 9 into the amplifier 3.

The output of the wavelength division multiplexer 7 is connected to an upstream amplification coil 11 formed from a coiled length of erbium-doped optical fiber. The output of the upstream amplification coil 11 is in turn connected to a gain flattening filter 13 which is pre-calibrated at a particular gain level to reduce tilt in the output of the amplifier 3 by attenuating the strength so that most amplified channels are roughly equal to the strength of the least amplified channels. A second coil 15 of erbium-doped optical fiber is connected to the output of the gain flattening filter 13, and an additional wavelength division multiplexer 16 is provided to couple the output of a second pump laser 17 into the amplifier 3. The output of the second wavelength division multiplexer 16 is connected to an optical output waveguide 19 as shown. Finally, the outputs of the pump laser 9, 17 are controlled by a digital signal processor 20 which transmits electrical control signals to power circuits 21a, b which are respectively connected to the pump lasers 9, 17. Each of the pump lasers 9, 17 may be a 980 nm pump manufactured by Lasertron located in Bedford, Mass. The digital signal processor 20 may be Model No. DPS56311 manufactured by Motorola located in Austin, Tex.

The gain controller 1 of the optical amplifier 3 includes a gain detecting circuit 22 for continuously making an on-line, real time determination of the output gain the amplifier 3, as well as manually operable set-point circuit 32 for providing a set-point signal indicative of a selected gain level,.

The gain detecting circuit 22 includes upstream and downstream optical taps 24a, b. The small amount of light diverted from these taps (which amounts to typically on 2% to 5% of the throughput) is directed onto photodiodes 26a, b. The electrical signals generated by the photodiodes 26a, b are conducted to transimpedance amplifiers 28a, b via connectors as shown. The output of the amplified electrical signals generated by the transimpedance amplifiers 28a, b is relayed to a ratio circuit 30 which may form part of the digital signal processor 20. The ratio circuit 30 transmits a signal to the digital signal processor 20 as to the relative strengths of the total optical input and total optical output and hence indicates the overall gain G of the amplifier 3, i.e., the gain of the combination of the signal component and the noise or ASE component that forms the optical input.

While the set-point circuit 32 has been shown independently of the digital signal processor 20, it may also be integrated into the circuitry of the processor 20. The set-point circuit 32 includes a knob, dial, or some other control which allows a system operator to select a particular gain level of the signal component of the optical input that he or she wishes the amplifier 3 to generate. Such set-point circuits are well known in the art and do not form any part of the invention per se.

Figure 2:
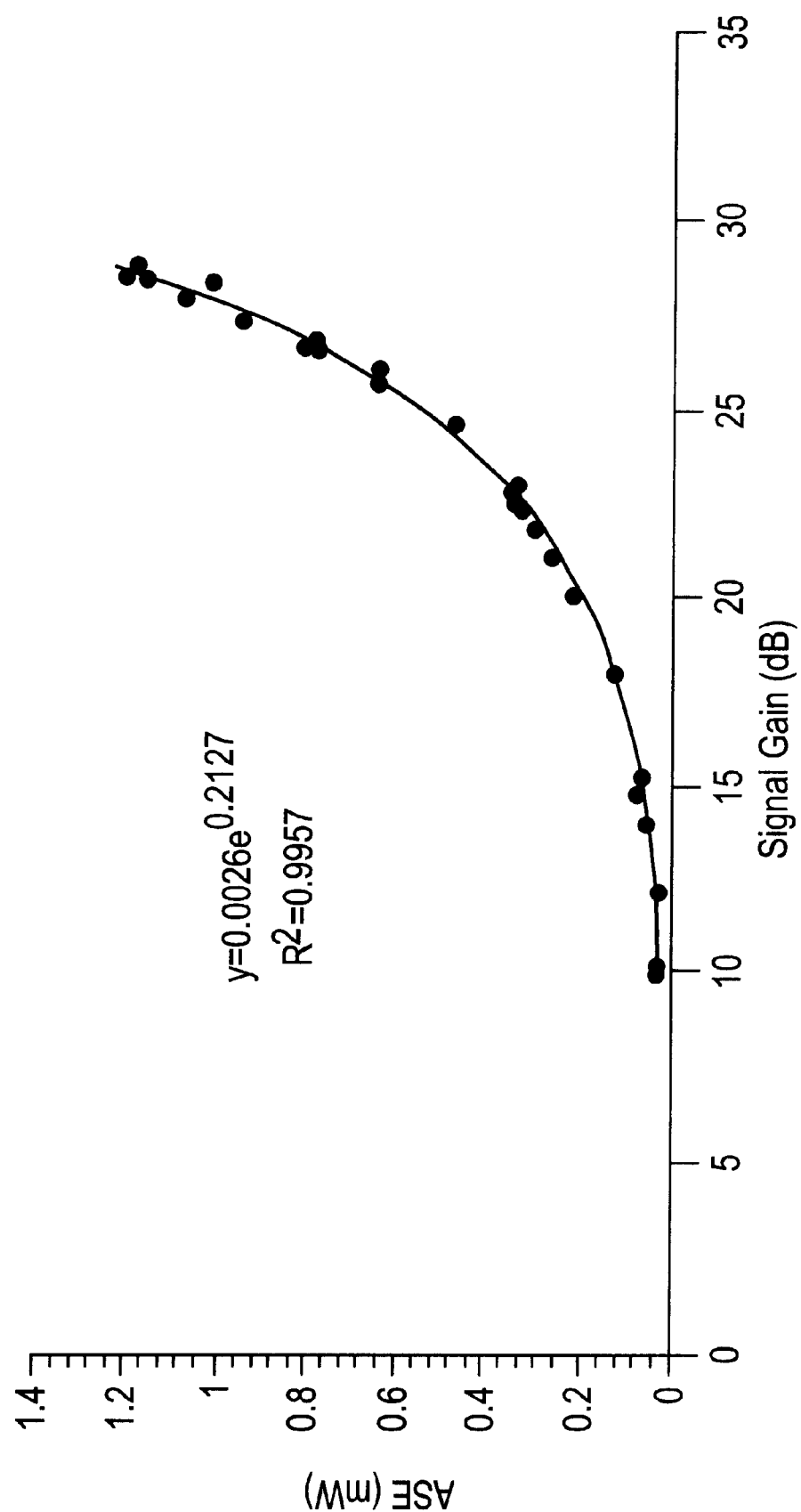
FIG. 2 illustrates the relationship between the power of the noise or ASE component in an amplified signal over a range of amplification levels.

The processor 20 is programmed to discount the power of the noise or amplified spontaneous emission (ASE) component of the optical input so that the gain selected via the set-point circuit 32 amplifies the signal component to the desired power level. The processor 20 accomplishes this by means of an empirically-derived equation that yields an output power for the amplified spontaneous emission at every point in the range of amplification provided by the amplifier 3. Accordingly, by plotting a curve through experimental data points as illustrated in FIG. 2, it has been determined that the ASE output power may be expressed as follows: $P_{out}^{ASE}=k_1 e^{k_2 G}$ where the experimentally determined coefficients $k_1=0.0026$, and $k_2=0.2127$. Other embodiments may have different coefficient values. They also can be determined experimentally.

In operation, the digital signal processor 20 receives a signal from the gain detecting circuit 22 indicative of the overall gain of the amplifier 3, or $P_{out}/P_{in}$. The processor 20 also receives a signal from the set-point circuit 32 indicative of a desired gain of only the signal component of the optical input, i.e., $(P_{out}-P_{out}^{ASE})/P_{in}$. The processor then proceeds to subtract the power of the ASE components $(P_{out}^{ASE})$ computed via the above empirically derived equation for the total output power $(P_{out})$ detected by the gain detecting circuit 22. The processor 20 then increases the gain of the amplifier 3 until the gain of the signal component $(P_{out}-P_{out}^{ASE})$ of the optical output $P_{out}$ is essentially equal to the selected gain indicated by the gain set-point circuit 32. Hence, if the power of the ASE component $P_{out}^{ASE}$ were 25% of the total optical power output $P_{out}$ of the amplifier 3, then the digital signal processor would increase the overall gain $P_{out}/P_{in}$ by one-third, or 33.3% so that the gain of the signal component would be equal to the gain selected by the set-point circuit 32.

Figure 3A:
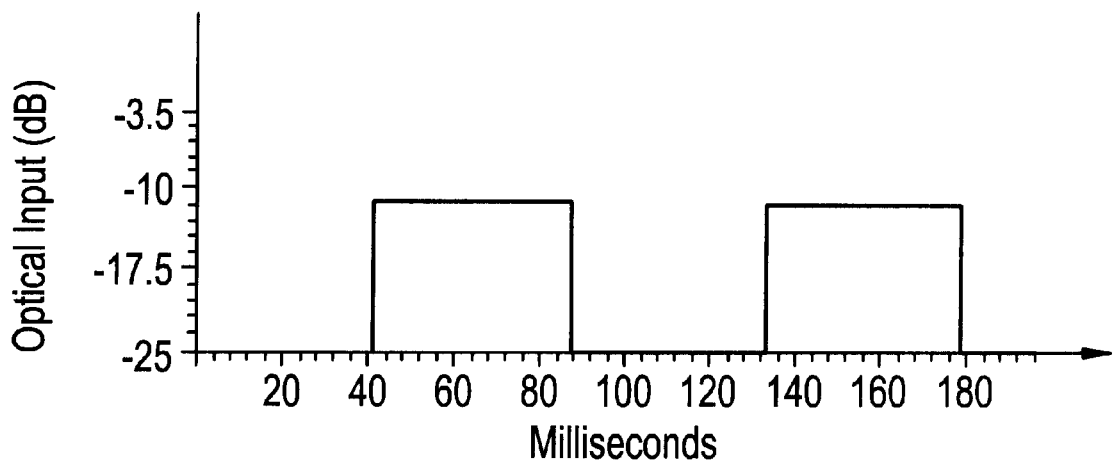
FIGS. 3A and 3B illustrate a transient optical input and the resulting optical output of an amplifier such as the one illustrated in FIG. 1 without the use of the method of the invention.
Figure 3B:
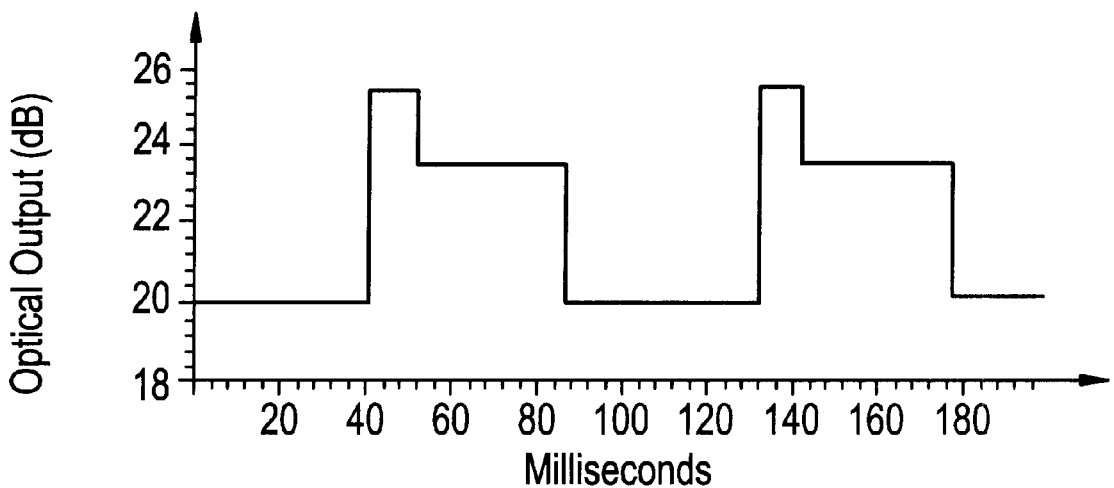

FIGS. 3A and 3B illustrate how a short-term change in the input signal can created an undesirable spike or overshoot in the resulting output when the previously described noise compensating gain controller 1 is operated without the benefit of the invention. Specifically, FIG. 3A illustrates two instances when there is a substantial change in the power of the optical input which is illustrated as being from −26 dB to −11 dB. Such changes in the power of the optical input is equivalent to adding and dropping of 32 of 33 channels of equal signal power. As illustrated in FIG. 3B, such changes result in an undesirable overshoot in output that is approximately 10 millisecond long, and is approximately 2 dB in amplitude. Such overshoots are highly undesirable particularly if there are several optical amplifiers installed in series in the network, as each amplifier in the series enlarges the spike caused by the transient.

The inventors have observed that the overshoot is caused by the lag time between the processor's computation of the overall difference or change in the amount of amplification necessary to bring the gain of the input signal $P_{in}$ to the gain selected by the set-point circuit 32, and the time necessary for the computation of the adjustment to this gain $G_{ASE}$. This is true even when the exponential function corresponding to the curve of FIG. 2 is represent in the following simpler, linear form: $P_{out}^{ASE}=mG+c$, wherein the empirically derived constants m and c are, respectively, 0.001534 and 0.032978. In general, the values for m and c can be 0<m<0.1 and −0.01<c<0.1 Such a lag time between the two computations is in turn caused by the fact that the processor 20 continuously computes the desired gain via a sampling technique at very high frequency. Accordingly, during relatively sharp input transients like the ones illustrated in FIG. 3A, the initial amplification adjustment computations are erroneous and do not become accurate until the processor 20 begins to sample and compute on the basis of a post-transient, steady-state condition of the optical input.

Figure 4:
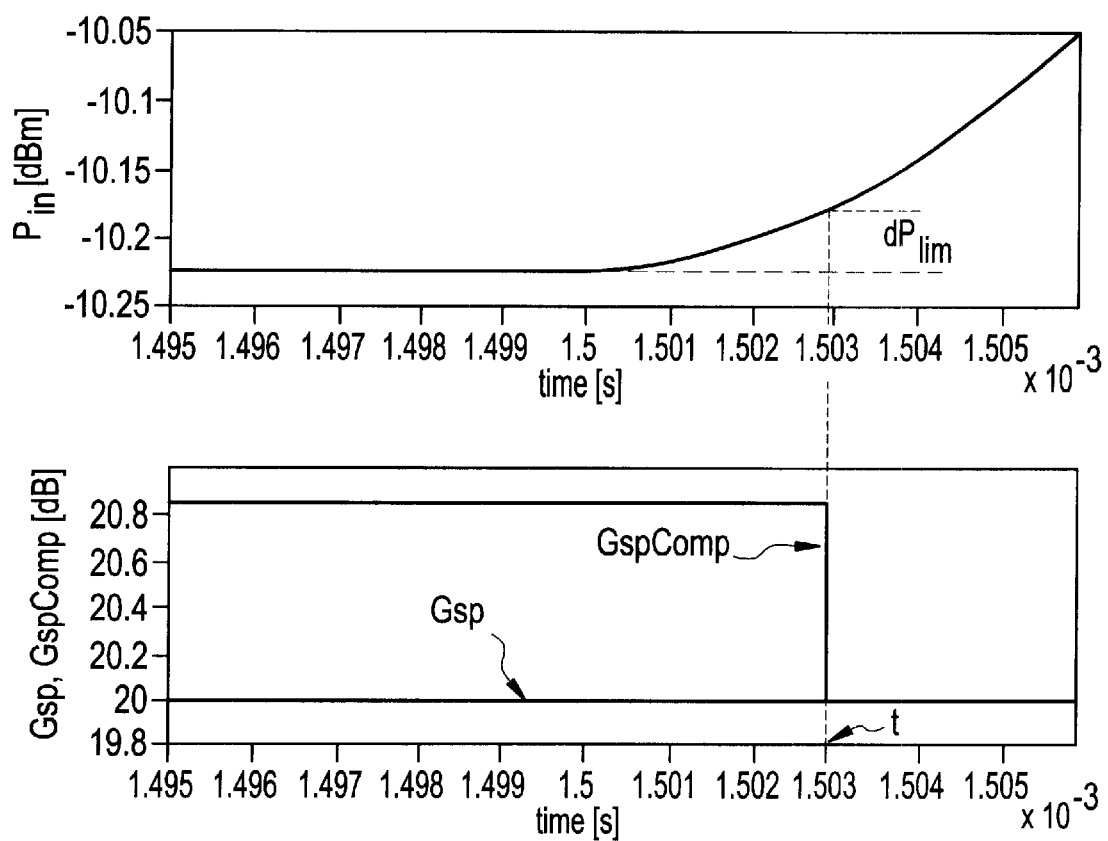
FIG. 4 illustrates a first embodiment of the method wherein the computation of the ASE compensation by the digital signal processor of the amplifier is delayed until after the initial amplification adjustment is computed and made, and the input transient has substantially ended.

FIG. 4 illustrates the first embodiment of the method of the invention, wherein the computation and implementation of the adjustment to the gain is deferred during the transient regime. Thus, while the overall gain of the amplifier 3 is changed so that the power of the optical output $P_{out}$ is consistent with the gain $G_{SP}$ selected at set-point, the ASE compensation is effectively "switched off" during the transient regime. This has the effect of under-amplifying the signal component of the optical input during the transient regime, since the power of the optical output $P_{out}$ includes both the power of the signal component and the power of the ASE component $(P_{out}=P_{out}^{ASE}+P_{out}^{S})$. However, immediately after the termination of the transient regime and upon the attainment of a "steady-state" condition in the optical input, the ASE compensation is "switched on" and the amplifier 3 proceeds to add additional amplification to the power of the optical output $P_{out}$ until only the power of the signal component $P_{out}^S$ of $P_{out}$ is equal to the selected set-point gain $G_{SP}$.

Figure 5A:
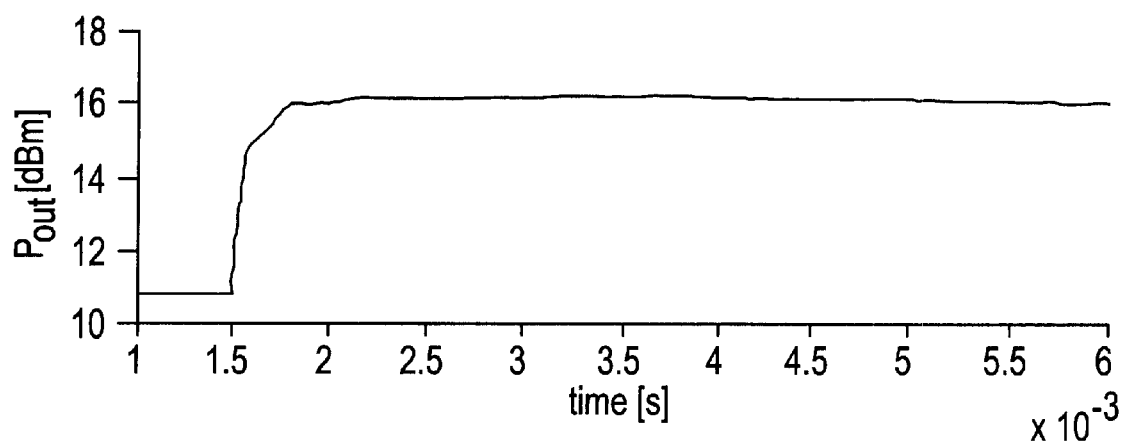
FIGS. 5A and 5B illustrate how the first embodiment of the invention results in a relatively smooth optical power output free of overshoots.
Figure 5B:
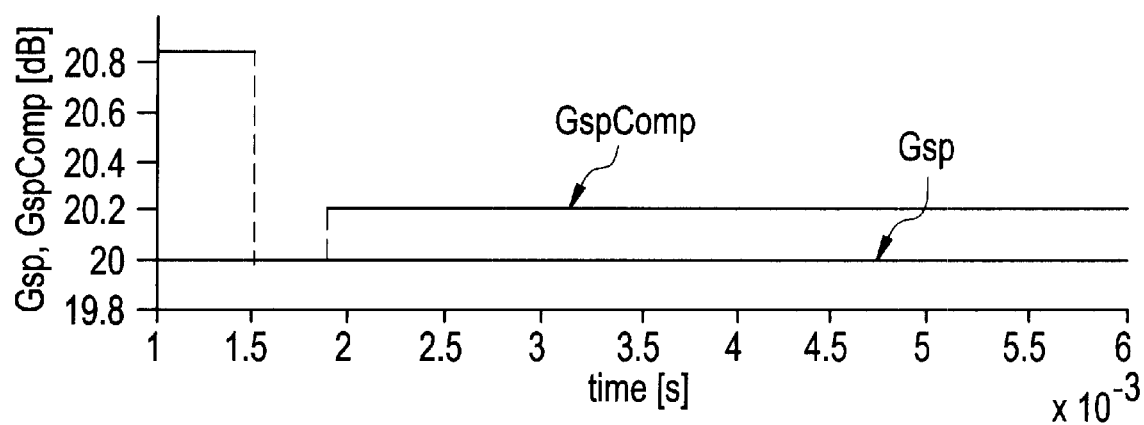

FIG. 4 illustrates how the first embodiment may be implemented. In the first step, the ASE compensation is turned off when a input signal change is larger than some threshold value as follows:

$$|\Delta P_{in}(k)|=|P_{in}(k)-P_{in}(k-i)|\geq \Delta P_{lim} \quad (1)$$

where k represents the present time step, $P_{in}(k)$ is the input power at time step k, and $P_{in}(k-i)$ is the value of input signal at i time steps prior to the present time step k. The value of i is typically between 1 and 10. The time difference between the two consecutive time steps is equal to $\Delta T$. The processor continuously reads the power of the optical input $P_{in}$. When the input power change reaches the above expressed threshold value in $\Delta P_{lim}$ (as indicated in the upper graph), the ASE adjustment is turned off (as is indicated in the lower graph of FIG. 4). The overall effect of this method on the power of the output $P_{out}$ of the amplifier 3 is illustrated in FIGS. 5A and 5B. As is best seen in FIG. 5B, the ASE compensation is "switched off" and the time period between 1.5 and 1.8 milliseconds. At this time, the power of the amplifier output $P_{out}$ ramps up from between about 11 dB to 16 dB. At approximately 1.8 milliseconds, the ASE adjustment is switched on again, and the processor 20 adds additional amplification to the optical input to bring the power of the signal component $P_s$ to the desired gain set-point (i.e., brings $G_{SP}$ to $G_{SPComp}$). An additional amount of amplification on the order of about 0.2 dB is added to $P_{out}$. Hence, an adjusted $P_{out}$ consistent with a selected gain set-point is achieved in approximately 0.3 milliseconds without the creation of undesirable amplification overshoots.

In the second embodiment of the method, the gain control and ASE adjustment are executed at the same speed by decreasing the rate of execution of the gain control loop so that the processor 20 does not complete the computation of the amplification change before it also completes the computation of the adjustment that must be made at the post-transient or near post-transient state of the optical input. This may be implemented by adjusting the pump lasers in the amplifier 3 in accordance with the following expression:

$$u(k) = u(k-1) + K\left(1+\frac{\Delta T}{T_i}\right)e(k) - e(k-1) \quad (2)$$

In this expression, u(k) is the control signal for the pump lasers, K and $T_i$ are tuning parameters, and $\Delta T$ is the sampling interval. This interval may be, for example, 1 microsecond at an execution rate of 1 MHz or 2 microseconds if the execution rate is dropped to 500 kHz. At the same time that the control signal u(k) for the laser pumps is being computed, the compensated value of the gain set-point ($G_{SP}$) is being computed in accordance with the following expression:

$$G(k) = G_{SP}(k) + \frac{mG(k-1)+c}{P_{in}} \quad (3)$$

Figure 6A:
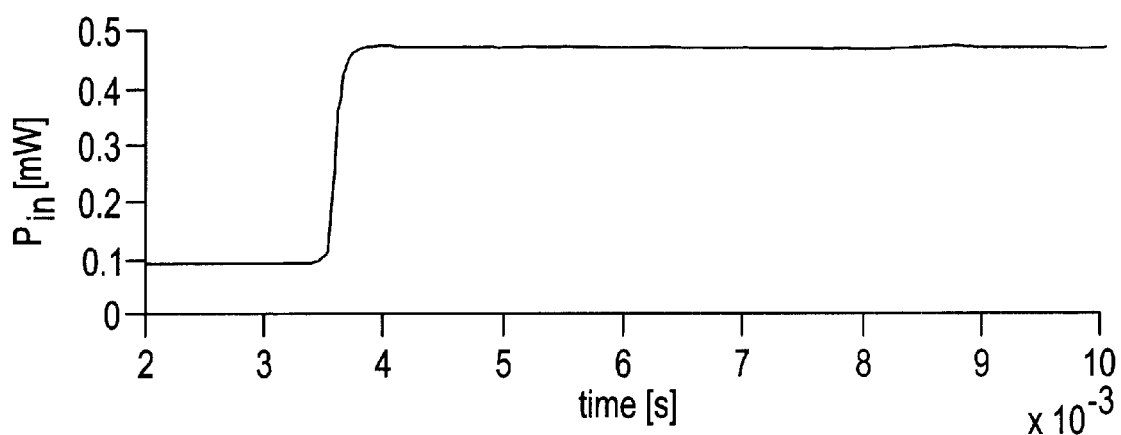
FIGS. 6A and 6B illustrate a second embodiment of the invention wherein the computation of the amplification change is protracted so that it is completed and implemented at the same time that the ASE adjustment computation is completed.
Figure 6B:
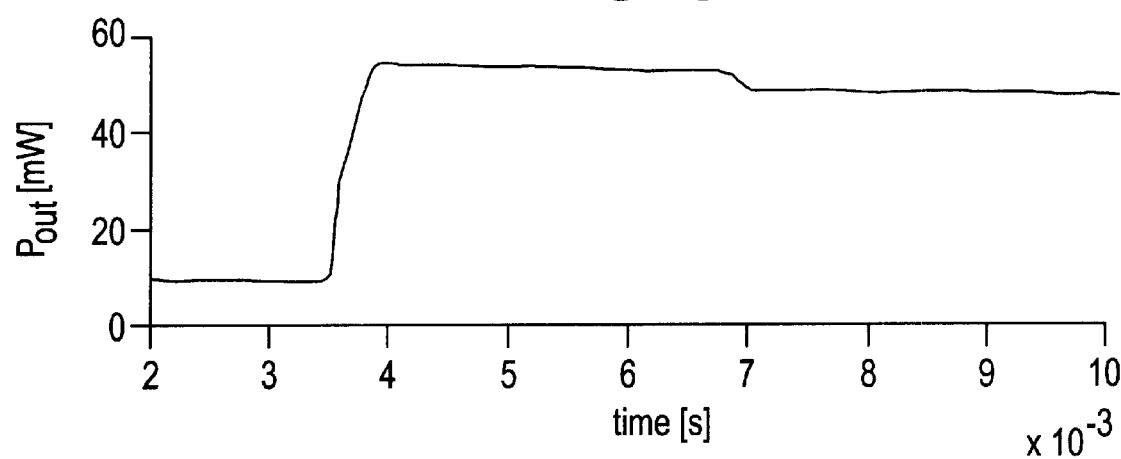

FIGS. 6A and 6B illustrate the result of this particular embodiment of the method. FIG. 6A illustrates a transient spike in optical input of between 0.1 mW and approximately 0.5 mW. FIG. 6B illustrates the corresponding power ($P_{out}-P_{out}^{ASE}$) of the optical output as it jumps from approximately 10 mW to approximately 56 mW after approximately 4 milliseconds. Upon the arrival of a steady-state condition the power of the output $P_{out}$ drops to approximately 50 mW after about 2.5 milliseconds.

Figure 7A:
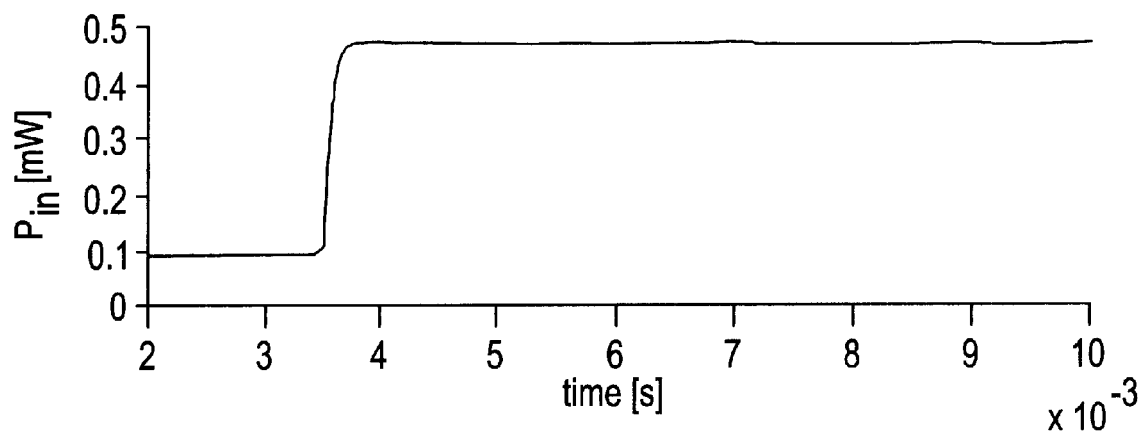
FIGS. 7A and 7B illustrate a third embodiment of the invention wherein lower priority tasks of the processor are temporarily suspended so that the computations for both the amplification change and ASE adjustment may be completed and implemented at the same time in a time period shorter than that required for the second embodiment of the method.
Figure 7B:
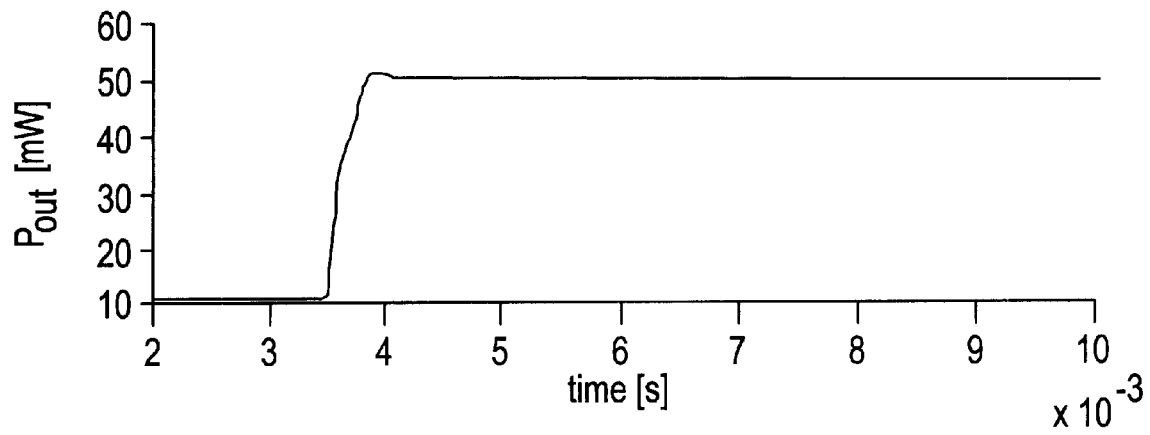

FIGS. 7A and 7B illustrate a third embodiment of the method of the invention which is, in effect, an improvement of the second method. In the third method, lower priority tasks that the processor 20 normally performs, such as, for example, alarm server, control loop for the pump laser temperature control, state machine, $P_{in}$ and $P_{out}$ filter, and various other low speed tasks are temporarily deferred to free up virtually all of the processing capability of the processor 20 during the transient regime. In this embodiment of the method, the control algorithm programmed into the processor 20 might take the following form:

Step 1. At time step k: Check if input power has changed compared to the time (k–i), from i steps before. If the change satisfies the threshold limit described by (1) then:

Step 2: Disable all other lower priority activities (command processing, alarm monitoring, house keeping, etc.) and calculate just the control signal and compensated gain set-point, equation (2) and (3). Calculate these two values as long as input power is settled to a new value (approximately 1–2 ms).

Step 3: Switch the ASE calculation to low speed, leave the gain control calculations at high speed. Enable all other computational tasks (command processing, alarm monitoring, etc.).

Step 4: Set k→k+1 and go to Step 1.

The effect of the implementation of this third embodiment of the invention is illustrated in FIGS. 7A and 7B. Note in particular how the transient spike in input power $P_{in}$ from 0.1 mW to approximately 0.5 mW results in a smoother increase in the power of the optical output $P_{out}$ during the transient regime. There is virtually no delay (as there was with respect to the first embodiment) in achieving the steady-state, adjusted amplification. Moreover, there is virtually no overshoot whatsoever as contrasted with the small amount of overshoot associated with the second method (compare FIG. 6B with 7B).

While the various embodiments of the method of the invention have been described with respect to specific examples, various additions and modifications of these methods will become evident to persons of ordinary skill in the art. All such modifications, variations and additions are intended to encompassed within the scope of this patent, which is limited only by the claims appended hereto.

PARTS LIST

1. Noise-compensating gain controller (first embodiment)
3. EDFA-type optical amplifier
5. Optical input waveguide
7. Wavelength division multiplexer
9. Pump laser
11. Upstream amplification coil
13. Gain flattening filter
15. Downstream amplification coil
16. Wavelength division multiplexer
17. Pump laser
19. Optical output waveguide
20. Digital processor
22. Gain detecting circuit
24. Upstream and downstream taps a, b 26. Photodiodes a, b
28. Transimpedance amplifiers a, b
30. Ratio circuit
32. Set-point circuit

What is claimed is:

1. A method for operating a noise compensating gain controller in an optical amplifier to avoid overshoot of a selected gain level during amplification transients, wherein said amplifier receives an optical input formed from a signal component and a noise component, comprising the steps of:
   (a) determining a difference in the amount of amplification necessary to bring the combination of said signal and noise component forming said optical output to said selected gain level;
   (b) determining an adjustment of said difference necessary to bring the signal component of the output to said selected gain level, a post-transient steady-state condition of said optical input, and
   (c) changing the amplification in accordance with said difference either prior to or simultaneously with said adjustment.

2. A method of operating a noise compensating gain controller according to claim 1, further comprising the step of determining that the power of said transient is larger than a preselected threshold level prior to implementing steps (a)–(c).

3. A method of operating a noise compensating gain controller according to claim 1, wherein said amplification is changed in accordance with said difference determined in step (a) prior to changing said amplification in accordance with the adjustment determined in step (b).

4. A method of operating a noise compensating gain controller according to claim 3, wherein step (b) is not commenced until step (a) is completed and the amplification is changed in accordance with said difference.

5. A method of operating a noise compensating gain controller according to claim 1, wherein steps (a) and (b) are implemented simultaneously by said noise compensating gain controller such that said amplification difference and adjustment are determined at substantially the same time, and wherein said amplification is then changed simultaneously in accordance with said difference and adjustment.

6. A method of operating a noise compensating gain controller according to claim 5, wherein said controller includes a processor circuit for computing said amplification difference of said amplification adjustment requires more processing time than the computation of said amplification difference and wherein said processor simultaneously determines said difference and said adjustment.

7. A method of operating a noise compensating gain controller according to claim 6, further comprising the step of protracting the processing time for the determination of said amplification difference such that it becomes simultaneously equal to the processing time for the determination of said amplification adjustments.

8. A method of operating a noise compensating gain controller according to claim 7, wherein the processing time for the computation of said amplification difference is protracted by cutting an execution rate for said computation in half.

9. A method of operating a noise compensating gain controller according to claim 6, wherein said processor performs a plurality of tasks in addition to said computations for said amplification adjustment, and further comprising the step of disabling one or more of said tasks to allow said processor to complete both computations simultaneously.

10. A method of operating a noise compensating gain controller according to claim 9, further comprising the step of monitoring changes in said input power at regular intervals, and terminating said disabling step when said input power does not change by a least a selected threshold amount between said regular intervals.

11. A method for operating a noise compensating gain controller in an optical amplifier to avoid overshoot of a selected gain level during amplification transients, wherein said amplifier receives an optical input formed from a signal component and a noise component, comprising the steps of:
   (a) determining a difference in the amount of amplification necessary to bring the combination of said signal and noise component forming said optical output to said selected gain level;
   (b) determining an adjustment of said difference necessary to bring the signal component of the output to said selected gain level in accordance with an imperically derived formula;
   (c) changing the amplification in accordance with said difference either prior to or simultaneously with said adjustment.

12. A method of operating a noise compensating gain controller according to claim 11, wherein said adjustment of step (b) is computed in accordance with the formula:

$$P_{out}^{ASE}=mG+c$$

wherein $$P_{out}^{ASE}$$

is the power of the noise component of the amplifier output, G=a sensed gain level, 0<m<0.1 and −0.01<c<0.1.

13. The method according to claim 12 wherein m=0.001534 and c=0.032978.

14. A method of operating a noise compensating gain controller according to claim 11, further comprising the step of determining that the power of said transient is larger than a preselected threshold level prior to implementing steps (a)–(c).

15. A method of operating a noise compensating gain controller according to claim 14, further comprising the step of determining whether the power change of said transient is larger than between about 0.05 dB and 0.50 dB.

16. A method of operating a noise compensating gain controller according to claim 11, wherein said amplification is changed in accordance with said difference determined in step (a) prior to changing said amplification in accordance with the adjustment determined in step (b).

17. A method of operating a noise compensating gain controller according to claim 16, wherein step (b) is not commenced until step (a) is completed and the amplification is changed in accordance with said difference.

18. A method of operating a noise compensating gain controller according to claim 11, wherein steps (a) and (b) are implemented simultaneously by said noise compensating gain controller such that said amplification difference and adjustment are determined at substantially the same time, and wherein said amplification is then changed simultaneously in accordance with said difference and adjustment.

19. A method of operating a noise compensating gain controller according to claim 18, wherein said controller includes a processor circuit for computing said amplification difference of said amplification adjustment requires more processing time than the computation of said amplification difference and wherein said processor simultaneously determines said difference and said adjustment.

20. A method of operating a noise compensating gain controller according to claim 19, further comprising the step of protracting the processing time for the determination of said amplification difference such that it becomes simultaneously equal to the processing time for the determination of said amplification adjustments.

21. A method of operating a noise compensating gain controller according to claim 18, wherein said processor performs a plurality of tasks in addition to said computations for said amplification adjustment, and further comprising the step of disabling one or more of said tasks to allow said processor to complete both computations simultaneously.

* * * * *